(12) United States Patent  
Petrou (10) Patent No.: US 10,948,112 B2  
(45) Date of Patent: Mar. 16, 2021

(54) PISTON ACTUATED ROTARY UNION (71) Applicant: Deublin Company, Waukegan, IL (US)

(72) Inventor: Anton A. Petrou, Hawthorn Woods, IL (US)

(73) Assignee: Deublin Company, Waukegan, IL (US)

( * ) Notice: Subject to any disclaimer, the term of this patent is extended or adjusted under 35 U.S.C. 154(b) by 0 days.

(21) Appl. No.: 16/661,331

(22) Filed: Oct. 23, 2019

(65) Prior Publication Data

US 2020/0056728 A1 Feb. 20, 2020

Related U.S. Application Data (62) Division of application No. 14/802,501, filed on Jul. 17, 2015, now Pat. No. 10,502,349.

(60) Provisional application No. 62/026,218, filed on Jul. 18, 2014.

(51) Int. Cl.  
F16L 27/08 (2006.01)  
B23Q 1/00 (2006.01)  
B23Q 11/10 (2006.01)

(52) U.S. Cl.  
CPC .......... F16L 27/082 (2013.01); B23Q 1/0036 (2013.01); B23Q 11/1023 (2013.01)

(58) Field of Classification Search  
CPC ................................ F16L 27/082; F16L 17/02  
USPC .............................. 285/95, 98, 101, 110, 336  
See application file for complete search history.

(56) References Cited

U.S. PATENT DOCUMENTS

| 4,187,764 | A | 2/1980 | Cho |
| 4,317,586 | A | 3/1982 | Campbell |
| 4,817,995 | A | 4/1989 | Deubler et al. |
| 5,170,693 | A | 12/1992 | Stary |
| 5,577,775 | A | 11/1996 | Pearson et al. |
| 5,617,879 | A | 4/1997 | Kubala |
| 5,669,636 | A | 9/1997 | Kubala |
| 5,707,186 | A | 1/1998 | Gobell et al. |
| 7,399,001 | B2 | 7/2008 | Maier |
| 7,815,224 | B2 | 10/2010 | Ford et al. |
| 2006/0273579 | A1 | 12/2006 | Ford et al. |
| 2011/0126909 | A1 | 6/2011 | Burrus et al. |
| 2014/0035274 | A1 | 2/2014 | LaCroix |
| 2014/0137960 | A1 | 5/2014 | Adams et al. |

FOREIGN PATENT DOCUMENTS

| JP | 2007-85408 A | 4/2007 |
| JP | 2008-261405 A | 10/2008 |
| JP | 4597017 B2 | 12/2010 |
| JP | 2014-016010 A | 1/2014 |
| JP | 2014-040915 A | 3/2014 |

Primary Examiner — Matthew Troutman  
Assistant Examiner — Fannie C Kee  
(74) Attorney, Agent, or Firm — Leydig, Voit & Mayer, Ltd.

(57) ABSTRACT

A rotary union includes a housing forming a bore and a piston bore having an open end and disposed at a radially offset distance with respect to the bore. The piston bore is fluidly isolated from the bore. A seal carrier is slidably disposed within the bore, and includes an actuation arm extending radially outwardly relative to the bore such that it overlaps the piston bore. A piston slidably disposed in the piston bore is extendible to releasably abut the actuation arm and urge the seal carrier to displace relative to the bore when the piston displaces relative to the piston bore.

3 Claims, 5 Drawing Sheets

PISTON ACTUATED ROTARY UNION

CROSS REFERENCE TO RELATED APPLICATIONS

The present application is a divisional of U.S. patent application Ser. No. 14/802,501, filed Jul. 17, 2015, which claims the benefit of U.S. Provisional Patent Application No. 62/026,218, filed on Jul. 18, 2014; the contents of both are hereby incorporated by reference.

TECHNICAL FIELD OF THE DISCLOSURE

The present invention relates to fluid coupling devices such as rotary unions and, more particularly, to an improved seal control actuator mechanism that operates with fluid pressure regardless of the use of lubricating media, non-lubricating media, or no media within the rotary union.

BACKGROUND OF THE INVENTION

Fluid coupling devices such as rotary unions are used in industrial applications, for example, machining of metals or plastics, work holding, printing, plastic film manufacture, papermaking, semiconductor wafer manufacture, and other industrial processes that require a fluid medium to be transferred from a stationary source such as a pump or reservoir into a rotating element such as a machine tool spindle, work-piece clamping system, or rotating drums or cylinder. Often these applications require relatively high media pressures, flow rates, or high machine tool rotational speeds.

Rotary unions used in such applications convey fluid medium used by the equipment for cooling, heating, or for actuating one or more rotating elements. Typical fluid media include water-based liquids, hydraulic or cooling oils, and air. In certain instances, for example, when evacuating media from a fluid passage, rotary unions may operate under vacuum. Machines using rotary unions typically include precision components, such as bearings, gears, electrical components, and others, that are expensive and/or difficult to repair or replace during service. These components are often subject to corrosive environments or to damage if exposed to fluid leaking or venting from the rotary union during operation.

A rotary union typically includes a stationary member, sometimes referred to as the housing, which has an inlet port for receiving fluid medium. A non-rotating seal member is mounted within the housing. A rotating member, which is sometimes referred to as a rotor, includes a rotating seal member and an outlet port for delivering fluid to a rotating component. A seal surface of the non-rotating seal member is biased into fluid-tight engagement with the seal surface of the rotating seal member, generally by a spring, media pressure, or other method, thus enabling a seal to be formed between the rotating and non-rotating components of the union. The seal permits transfer of fluid medium through the union without significant leakage between the non-rotating and rotating portions. Fluid medium passing through the rotary union may lubricate the engaged seal surfaces to minimize wear of the seal members. When a rotary union is used with non-lubricating media (such as dry air) or without any media, the engaged seal surfaces can experience a "dry running" condition, which causes rapid seal wear due to lack of adequate lubrication. Extended periods of dry running can cause severe damage to the seal members, thereby requiring expensive and time-consuming replacement of one or both seal members.

High-speed machining equipment, such as computer-numerical-control (CNC) milling machines, drilling machines, turning machines, transfer lines, and so forth, use rotary unions to supply a medium directly to the cutting edge of a tool for cooling and lubrication in an arrangement that is commonly referred to as "through spindle coolant." A through spindle coolant arrangement extends the service life of costly cutting tools, increases productivity by allowing higher cutting speeds, and flushes material chips that can damage the work-piece or cutting tool away from the cutting surfaces of the tool. Different work-piece materials typically require different media for optimal productivity and performance. For example, air or aerosol media may provide better thermal control when machining very hard materials, while liquid coolants may offer better performance when machining softer materials, such as aluminum. In addition, certain kinds of work may be performed more effectively and less expensively without a through-spindle medium.

In certain applications, it may also be desired to avoid any spillage of the working fluid of the coupling when the seal is disengaged, for example, when changing tool spindles. Along these same lines, it may further be desired to engage the rotary seal of the coupling before the working fluid is at full pressure so that the initiation of flow, which flow may include a mixture of the working fluid with air, does not cause leakage of the working fluid.

BRIEF SUMMARY OF THE DISCLOSURE

In one aspect, the disclosure describes a rotary union. The rotary union includes a housing having a bore in fluid communication with a media channel opening and a piston bore having an open end disposed at a radially offset distance with respect to the bore. The piston bore is fluidly isolated from the media channel opening and the bore, and is fluidly connected to an actuation port. A non-rotating seal carrier is slidably disposed within the bore, and the housing has a media channel in fluid communication with the bore. An actuation arm is connected to the non-rotating seal carrier and extends radially outwardly therefrom with respect to the bore. The actuation arm at least partially overlaps the open end of the piston bore. A piston is slidably disposed within the piston bore such that a variable piston volume is defined between the piston and the piston bore. The variable piston volume is fluidly connected to the actuation port, and the piston is adapted to extend out from the open end of the bore when a fluid pressure provided via the actuation port is present in the variable piston volume. The piston is configured to releasably abut the actuation arm and to urge the actuation arm, and thus the non-rotating seal carrier, to displace relative to the bore when the piston displaces relative to the piston bore. A seal is disposed around the non-rotating seal carrier to create a sliding seal between the non-rotating seal carrier and the bore. The non-rotating seal carrier is arranged to extend relative to the housing when the fluid under pressure is present in the piston bore.

In another aspect, the disclosure describes a method for operating a rotary union. The method includes providing a housing having a bore in fluid communication with a media channel opening and a piston bore having an open end disposed at a radially offset distance with respect to the bore, the piston bore being fluidly isolated from the media channel opening and the bore and fluidly connected to an actuation port. The method further includes slidably disposing a non-rotating seal carrier within the bore in the housing, and fluidly connecting a media channel with the bore. An actuation arm connected to the non-rotating seal carrier and extending radially outwardly therefrom with respect to the bore is provided such that the actuation arm at least partially overlaps the open end of the piston bore. A piston is slidably disposed within the piston bore such that a variable piston volume is defined between the piston and the piston bore. The method also includes applying an actuation fluid pressure at the actuation port such that the actuation fluid pressure is present in the variable piston volume to provide a pneumatic force tending to extend the piston relative to the piston bore, and pushing the actuation arm with the piston and urging the actuation arm, and thus the non-rotating seal carrier, to displace relative to the bore when the piston displaces relative to the piston bore.

DETAILED DESCRIPTION

Figure 1:
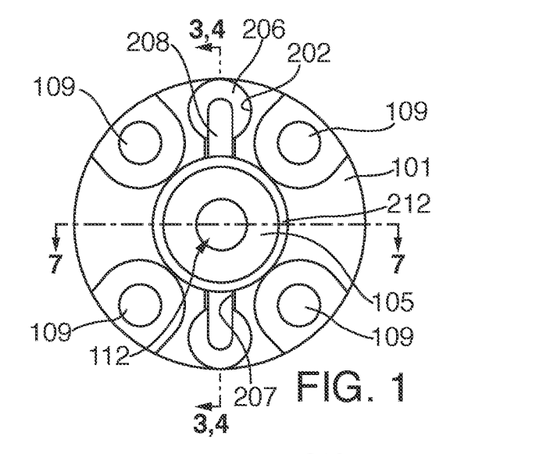
FIG. 1 is a front view of a non-rotating portion of one embodiment of a rotary union in accordance with the disclosure.
Figure 2:
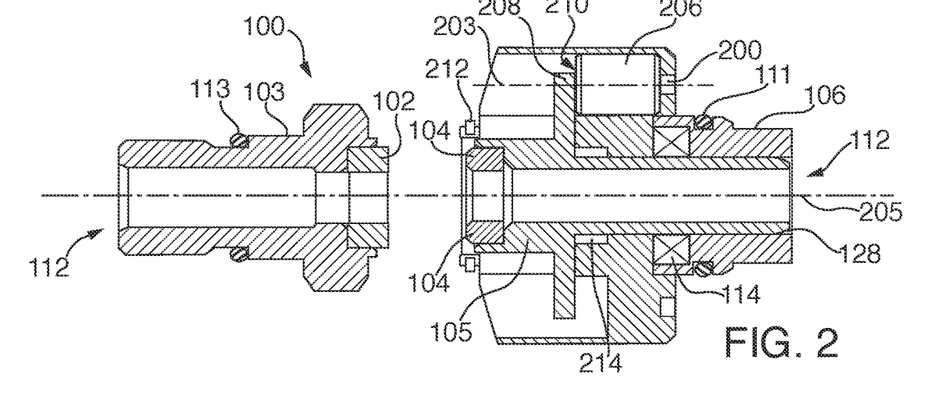
FIGS. 2, 3 and 7 are cross sections of the embodiment of a rotary union shown in FIG. 1 in two operating positions.
Figure 3:
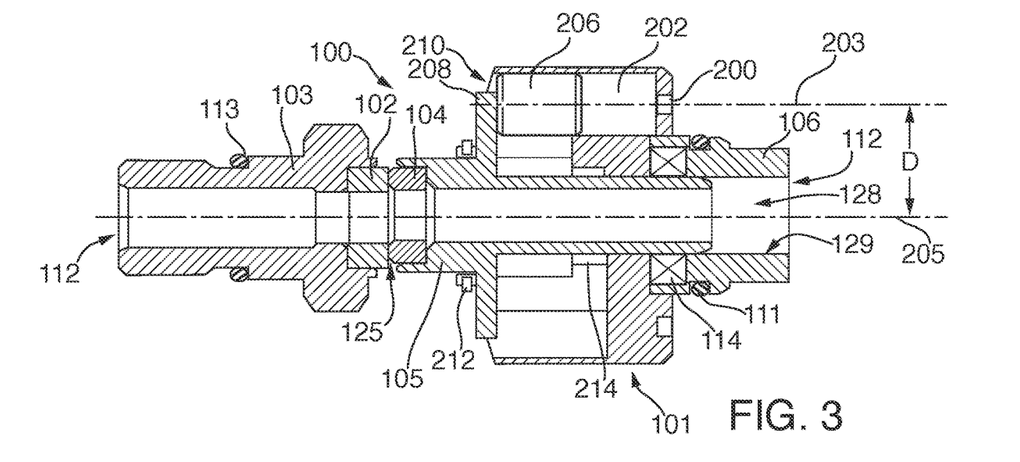

In the drawings, which form a part of this specification, FIG. 1 is a front view of a non-rotating portion 101 of the rotary union 100. FIGS. 2 and 3 are cross sections of the rotary union 100 in two operating positions. In reference to FIGS. 1-3, the rotary union 100 includes a rotating seal member 102 connected to the end of a rotating seal carrier 103, which is commonly referred to as a rotor, and a non-rotating seal member 104 that is connected at the end of a non-rotating seal carrier 105. The non-rotating seal carrier 105 is axially moveable relative to a housing 106, which is best shown in FIGS. 2 and 3. Although the housing 106 is shown as a two-piece construction in FIGS. 2 and 3, a single piece construction, or a construction of more than two pieces may be used as desired for the housing 106. In the present disclosure, the housing 106 is referred to as a single structure without regard to the number of pieces that make up its construction. The rotating seal member 102 is associated with a rotating machine component (not shown) such as a machine spindle, as is known. The housing 106 is associated with a non-rotating machine component (not shown). A segmented conduit or media channel 112 extends through the rotating seal carrier 103, the non-rotating seal carrier 105, and the rotating and non-rotating seal members 102 and 104 respectively, as best illustrated in FIGS. 2 and 3.

Portions of the media channel 112 are defined in different components of the rotary union 100 to provide a fluid passageway through the rotating and non-rotating carriers 103 and 105 when the rotating and non-rotating seal members 102 and 104 are engaged. The media channel 112 may be selectively arranged to sealingly enclose fluids when the rotating and non-rotating seal members 102 and 104 are engaged to one another, and be open for venting to the atmosphere when the rotating and non-rotating seal members 102 and 104 are not engaged, as is described in more detail relative to the operation of the rotary union 100 and the description that follows relative to the flowchart of FIG. 6, described below. In certain applications, the media channel 112 may be subjected to a vacuum that pulls and evacuates working fluids from within the media channel 112.

The rotating seal carrier 103, which can be connected or associated with any type of machine component such as a spindle on a CNC milling machine, supports the rotating seal member 102. A mechanical face seal is created when the rotating seal member 102 is engaged with the non-rotating seal member 104. The mechanical face seal operates to seal the media channel 112 for transferring a fluid medium from the rotating to the non-rotating seal carriers 103 and 105 and, thus, through corresponding machine components to which the carriers are connected. In the illustrated embodiment, the housing 106 is connectable to a non-rotating portion or component of a machine by bolts (four shown) extending through bolt holes 109 to engage corresponding threaded openings formed in the non-rotating machine component, but other mounting arrangements can be used.

The non-rotating machine component may form a bore that sealably engages an outer seal 111 disposed around a portion of the housing 106, as shown in FIGS. 2 and 3. Similarly, a bore formed in the rotating machine component may sealably engage an outer rotating seal 113 disposed around a portion of the rotating seal carrier 103. In the illustrated embodiment, a secondary seal 114 is disposed between the housing 106 and the non-rotating seal carrier 105. The secondary seal 114 slidably and sealably engages the non-rotating seal carrier 105 to provide a sealing function between the non-rotating seal carrier 105 and the housing 106 during operation. As shown in the sections of FIGS. 2 and 3, the secondary seal 114 is represented generically having a rectangular section. It is contemplated that the secondary seal 114 can be embodied as any appropriate type of sliding seal, for example, a U-cup seal, O-ring seal, lip seal and the like. When pressurized media or a vacuum is present within the media channel 112, the secondary seal 114 acts to seal the media channel 112 from the environment and other portions of the rotary union 100.

In the embodiment for the rotary union 100 shown in the cross section of FIGS. 2 and 3, the non-rotating seal member 104 is connected to the non-rotating seal carrier 105. The non-rotating seal carrier 105 is slidably and sealably disposed within a bore 128 of the housing 106, and has an outer diameter portion that slidably engages a land 129 of the bore 128. The bore 128 is generally cylindrical and may form a slight gap between an inner diameter thereof and an outer diameter of the non-rotating seal carrier 105 to allow for angular mis-alignment in an axial direction between the non-rotating seal carrier 105 and the bore 128, which advantageously permits the rotary union to accommodate assembly and operational misalignment conditions between rotating and non-rotating machine components. The axial length and inner diameter dimension of the land 129, which extends annularly around the non-rotating seal carrier 105, can be selected depending on the particular design requirements and expected misalignment between components for each application. The structural arrangement permitting sliding of the non-rotating seal member 104 relative to the housing 106 enables the selective engagement and disengagement of the non-rotating seal member 104 with the rotating seal member 102, and compensates for axial displacement that may be present as between the two seal members 102 and 104.

In the illustration of FIG. 2, the seal members 102 and 104 are shown in a disengaged position in which the non-rotating seal carrier 105 is retracted within the bore 128 relative to the housing 106. In the illustration of FIG. 3, the seal members 102 and 104 are shown in an engaged position in which the non-rotating seal carrier 105 is extended within the bore 128 relative to the housing 106. In the engaged position, a mechanical face seal is formed at or around an interface 125 between the rotating and non-rotating seal members 102 and 104.

The housing 106 has passages and openings for provision of a working fluid to the media channel 112, which may be a liquid or a gas, and for provision of air or a vacuum to an activation channel, which causes the non-rotating seal carrier 105 to move relative to the housing 106. More specifically, the housing 106 forms an actuation port 200, which is fluidly connected to a piston bore 202 formed in the housing 106. The piston bore 202 has a centerline 203 that extends parallel to a centerline 205 of the bore 128, as shown in FIGS. 2 and 3, at an offset distance, D (denoted in FIG. 3), therefrom.

A floating piston 206 is slidably disposed within the piston bore 202. The floating piston 206 has a generally cylindrical shape that freely and generally sealably moves within the piston bore 202. In the illustrated embodiment, air or another fluid at a pressure applied at the actuation port will fill the piston bore and induce a pneumatic (or, hydraulic, depending on the type of fluid used) force onto an axial face of the piston 206 tending to push the piston 206 in an outward or extending direction relative to the housing 106. A vacuum may also be applied to retract the piston 206 into the bore 202. During operation, a force tending to extend the piston 206 relative to the housing 106 is transferred to the non-rotating seal carrier 105. In the particular embodiment shown, the non-rotating seal carrier 105 forms, or is connected to, an actuation arm 208 that extends radially outwardly from the non-rotating seal carrier 105 relative to the bore centerline 205. The actuation arm 208 is contacted by an axially-outward face 210 (denoted in FIG. 3) of the piston 206 and is pushed thereby while the piston 206 is urged to extend, and extends, relative to the housing 106 as described above. In the illustrated embodiment, the arm 208 is slidingly accepted within a slot or channel 207 formed in the housing 106. The arm 208 and slot 207 together form a keyed arrangement that prevents rotation of the non-rotating seal carrier 105 during operation.

Additional force components or force contributions may affect a net force tending to extend or translate the non-rotating seal carrier 105 relative to the housing 106. For example, a spring (not shown), may be added between the non-rotating seal carrier 105 and the housing 106 tending to bias the non-rotating seal carrier 105 either toward or away from the housing 106. In one embodiment, for example, such a spring may be placed within the bore and connected between the piston and housing to provide a force therebetween that biases the piston either away or towards the housing. Additionally, the non-rotating seal carrier 105 may present a net hydraulic surface, which can also be referred to as a balance ratio, that is exposed to fluid pressure within the media channel 112 and which yields a force tending to urge the non-rotating seal carrier 105 to move in the presence of fluid within the media channel 112.

The size or dimension of a clearance between the piston 206 and the bore 202, which facilitates the free motion of the piston 206 within the bore 202, may be controlled in a fashion that is similar to the seals provided between a bore and a reciprocating piston in an internal combustion engine to permit at least some leakage of fluid from within the bore 202 to the environment. Such leakage may help to discourage sticking or binding of the piston 206 within the bore 202 during operation.

During operation, the application of a relatively low air pressure to the piston bore 202 will cause the non-rotating seal carrier 105 to extend relative to the housing 106. In other words, notwithstanding any hydraulic forces acting on the non-rotating seal carrier 105 by the media and causing the same to axially move relative to the housing 106, an application of air pressure to the piston bore 202 will have the effect of a pneumatic (or hydraulic, depending on the type of fluid used) linear piston actuator that uses the piston 206 to push against the arm 208 and extend the non-rotating seal carrier 105 relative to the bore 202 of the housing 106. Specifically, when an air flow is provided to the air actuation port 200, the flow momentum and pressure of that air will fill the piston bore 202 and, even though some of the air may leak through the gap between the piston 206 and bore 202, it will dynamically and pneumatically push against a back side of the piston 206, thus causing the non-rotating seal carrier 105 to move in an extending direction relative to the housing 106. Put another way, axial motion of the rotor or rotating seal carrier 103 towards the housing 106 may be prevented while air pressure is present within the piston bore 202. A snap ring 212 may be connected to the housing 106 and arranged to limit the axially outward motion of the non-rotating seal carrier 105 relative to the housing 106 by contacting the arm 208 through the end of the slot 207 when the non-rotating seal carrier 105 is in a fully extended position, as shown in FIG. 3.

In one aspect, the rotary union 100 is configured to prevent undesired forces acting on the non-rotating seal carrier 105 in the event of partial or complete failure of the secondary seal 114 during operation. For example, a partial or complete failure in the sealing function of the secondary seal 114 may result in media present within the media channel 112 passing along the land 129 of the bore 128 and into the vicinity of the piston 206. If a sufficient amount of media can collect and pressurize around the piston 206, it may impart a hydraulic force onto the piston and, thus, onto the non-rotating seal carrier 105. Moreover, such fluid may further intrude into the pneumatic system that is connected to the air actuation port 200. To avoid such effects in the event of leakage, the rotary union 100 includes a fluid venting arrangement, as is shown in the cross section of FIG. 7.

Figure 7:
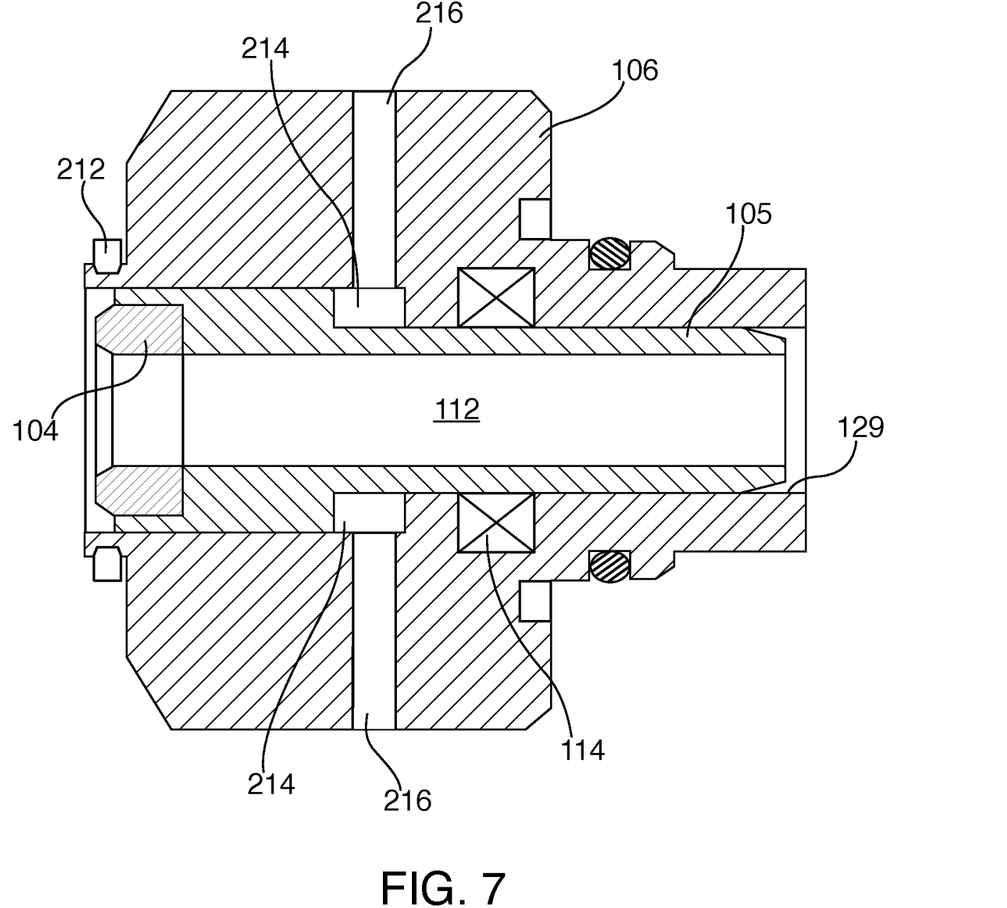

In reference to FIG. 7, the housing 106 forms a collection channel 214, which in the illustrated embodiment is disposed within the bore 128 such that the secondary seal 114 is between the collection channel 214 and a fluid inlet side of the media channel 112. The collection channel 214 extends annularly around an entire cross section of the bore 128. In this arrangement, fluid from within the media channel 112 that may leak past the secondary seal 114 will collect within the collection channel 214. At least one vent passage 216 is formed in the housing 106. In the illustrated embodiment, two vent passages 216 are shown. Each vent passage 216 extends entirely through the housing 106 between the collection channel 214 and an outer portion of the housing 106 so that any fluid present within the collection channel 214 can exit the rotary union 100 through the vent passage 216. Depending on the installation orientation of the rotary union, fluid may pass through the vent channel by force of gravity or by displacement of fluid as additional fluid may be added into the collection channel. Notably, presence of the vent passage ensures that no leaked fluid pressurization may occur within the rotary union, which may affect operation of the rotary union as previously described.

Figure 4:
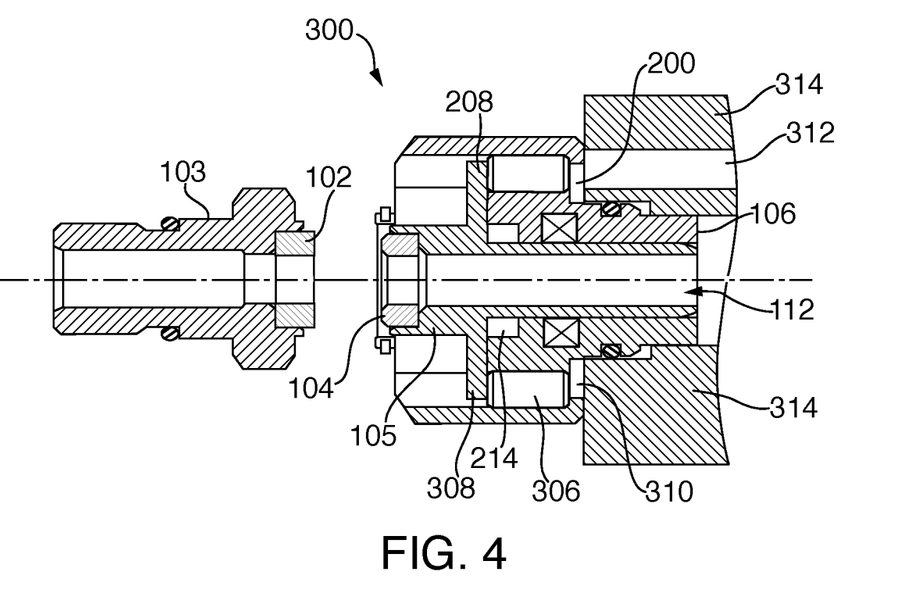
FIGS. 4 and 5 are cross sections of a second embodiment of a rotary union in two operating positions.
Figure 5:
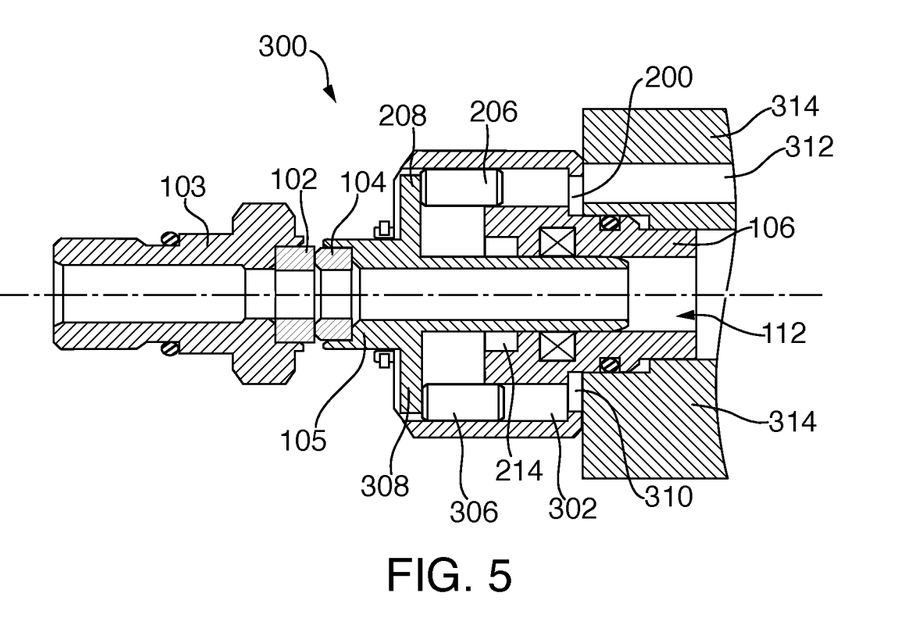

An alternative embodiment of the rotary union 100 is shown in FIGS. 4 and 5. Here, like reference numerals denote like structures as previously described and shown, for example, in FIGS. 2 and 3, for simplicity. In this embodiment, a rotary union 300 includes a second piston 306 that pushes against a second arm 308 formed on or connected to the non-rotating seal carrier 105. The second piston 306 is disposed in a second bore 302 formed in the housing 106. The second bore 302 is parallel to the bore 202 that accommodates the first piston 206, as described above, such that both pistons 206 and 306 can impart a force in a single direction onto the non-rotating seal carrier 105. In the illustrated embodiment, the pistons 206 and 306 are of the same construction, i.e., of identical size and shape, and are subject to the same or a common source of pneumatic pressure during operation. As shown, a combined air passage 312 formed in a non-rotating machine component 314 into which the housing 106 is connected, is fluidly connected to an annular channel 310 defined between a channel formed in the housing 106 and a surface of the machine component 314. The annular channel fluidly interconnects the combined air passage 312 with the first and second bores 202 and 302 such that air pressure applied to the combined air channel is distributed equally to the first and second bores 202 and 302.

In a fashion similar to the first piston 206 that bears against the arm 208, the second piston 306, which floats in the respective second bore 302, bears against the second arm 308 and operates to push the same, and also the non-rotating seal carrier 105, when an air pressure is present within the second bore 302. In this configuration using two pistons, the force with which the pistons urge the non-rotating seal carrier 105 in an extending direction relative to the housing 106 can be doubled when compared with the extending force applied by a single piston of the same size, as in the rotary union 100 described above. Additionally, two pistons, as is the case in the illustrated embodiment, or more than two pistons can be used. The two or more pistons may be symmetrically arranged around the non-rotating seal carrier 105 to apply forces symmetrically to the non-rotating seal carrier and thus diminish or avoid misalignment of the non-rotating seal carrier relative to the bore of the housing in which it is slidably disposed.

Figure 6:
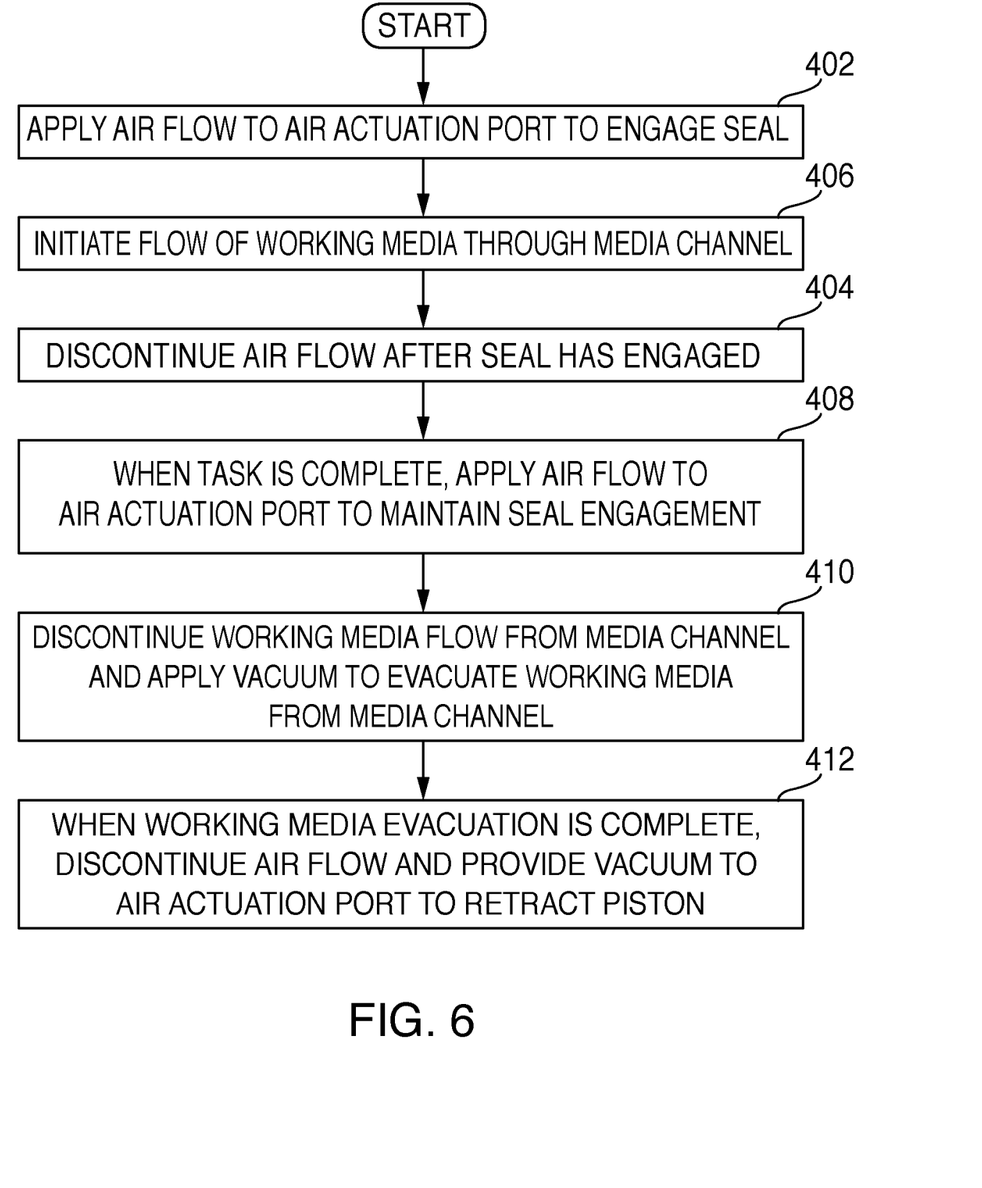
FIG. 6 is a flowchart for a method of operating a rotary union in accordance with the disclosure.

A flowchart for a method of operating the rotary union 100 or 300 is shown in FIG. 6. The described method is presented to illustrate one possible mode of operating rotary unions in accordance with the present disclosure, and should not be understood to be exclusive of other operating modes or exhaustive of all possible operating modes. The described method includes desirable features for the operation of a rotary union, all or a subset of which may be used at different times during operation or in different applications depending on the particular requirements of each operating task.

The described method is applicable to the use of a rotary coupling in a machine tool, where undesirable operational characteristics may be present at the beginning and at the end of a work task. The work task contemplated may include a cycle of initiation, use, and evacuation of the working media from within the rotary union. In the contemplated application, leakage of the working media is undesired both at the beginning and at the end of the work task, when the face seals are engaging and disengaging, respectively.

With the foregoing in mind, an air flow is applied to the air actuation port at 402, which operates to engage the rotary seal in the absence of working media as previously discussed. For example, the air flow may be applied to the air actuation port 200 or 300 to urge the respective piston(s) against the arms of the non-rotating seal carrier and push the same, thus extending the non-rotating seal carrier relative to the housing to engage the mechanical face seal between the rotating and non-rotating seal members 102 and 104. When the seal has engaged, the air flow may be optionally discontinued at 404, which in one embodiment occurs at the same time or shortly follows initiation of the media flow in the media channel at 406. It should be appreciated that for those rotary union embodiments that include an opening spring, discontinuation of the air flow in the absence of working media may cause the seal to disengage and, thus, for those embodiments, process step 404 may be omitted. For those embodiments that do not include an opening spring, discontinuation of the air flow may not cause the seal to disengage if static forces, such as friction, and closing forces, such as springs, etc., can overcome any opening forces such that seal engagement may be maintained.

With the rotary seal engaged, a flow of working media may be initiated at 406. Closure of the seal prior to initiation of working media flow may be desirable for various reasons. For example, even though incompressible working media will cause seal engagement based on the balance ratio of the rotary union, insufficient hydraulic forces during a limited period of flow initiation within the media channel may permit fluid leakage unless the seals are already engaged. By first providing the air flow to engage the seal at 402, one may ensure against such undesirable fluid leakage.

When the work task is complete, an air flow may be applied to the air actuation port at 408. Ordinarily, the force tending to engage the seals may not be compounded with a hydraulic force from the working media to reduce seal wear. Here, the application of the air flow is for a limited time while the working fluid flow and pressure are reduced so that the seal may remain in an engaged condition. Optionally, a vacuum may be applied to the media channel to remove any remaining working fluid at 410, while the air flow is still applied to maintain the seal in an engaged condition. In this way, effective evacuation of the media channel can be achieved and fluid leakage can be avoided.

When evacuation of the working fluid is complete, the air flow to the air actuation port is discontinued and may optionally be replaced by the application of a vacuum at that same port at 412. As previously described, application of vacuum to the air actuation port may cause a retraction of the piston(s) within the respective piston bore(s), which can remove impediments for seal disengagement as well as operate to clean the bore from any fluids and/or other debris that may have collected therein. It should be appreciated that this process step may not be required if an opening spring is used to urge the seal members apart. Alternatively, disengagement of the seal members can be accomplished by axial motion of the rotating seal member.

In operation, the rotary union 100 or 300 may use an air flow or a liquid coolant flow provided at just above atmospheric pressure to the piston bore(s) such that the seal members 102 and 104 can be engaged. The magnitude of the various relevant parameters, and the dimensions of the associated structures, may change depending on the particular dimensions that are selected for the structures that facilitate the engagement or disengagement of the seals.

Figure 8:
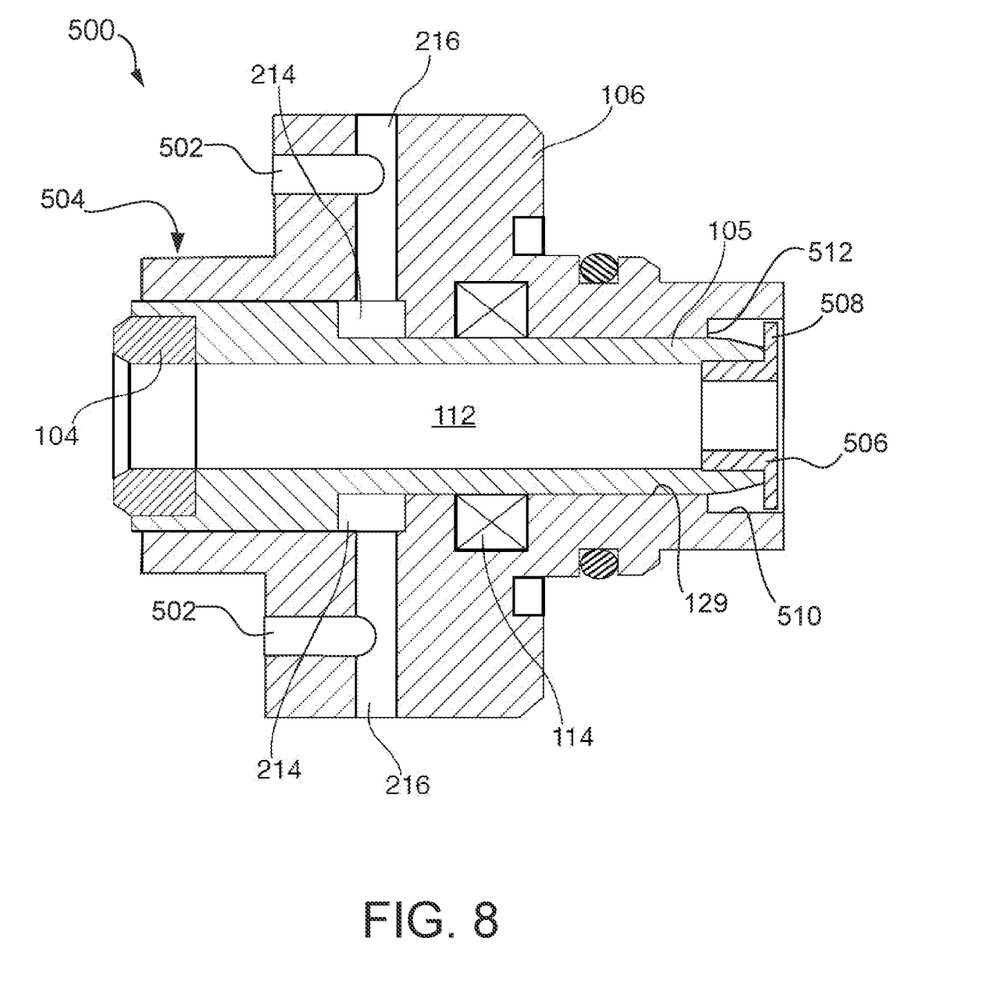
FIG. 8 is a cross section of an alternative embodiment of a rotary union in accordance with the disclosure.

A cross section of an alternative embodiment of a rotary union 500 is shown in FIG. 8, in which structures and features that are the same or similar to corresponding structures and features of the rotary union 100 previously described are denoted by the same reference numerals previously used for simplicity. It is noted that the cross section of FIG. 8 has been taken in the same orientation as the cross section shown in FIG. 7, but in the corresponding union 500. As can be seen when comparing FIGS. 7 and 8, the rotary union 500 is generally similar to the rotary union 100, but with structural differences as discussed below.

One structural difference in the rotary union 500 is in the additional venting openings 502 (two shown), which are disposed in fluid communication with the vent passages 216 and extend perpendicular thereto, as shown, along a centerline of the media channel 112. The additional venting openings 502 facilitate venting or drainage of fluid from the collection channel 214 when the rotary union 500 operates in any orientation. Additionally, a ledge 504 is formed in the housing 106 that serves to both reduce the mass of the housing 106, as compared to the housing 106 of the embodiment shown in FIG. 7, as well as to provide a more ready avenue for fluid venting or draining from the additional venting openings 502.

With respect to a providing a mechanical stop to limit extension of the non-rotating seal carrier 105 with respect to the housing 106, the rotary union 500 includes a collar 506 that forms a radially-outwardly extending flange 508. The collar 506 in the illustrated embodiment is press-fit into an end of the non-rotating seal carrier 105 such that the flange 508 protrudes outwardly from an end of the non-rotating seal carrier 105. In the illustrated embodiment the bore 128 has a stepped portion 510 that is disposed radially outwardly with respect to the land 129 of the bore 128 and that accommodates therein the flange 508 with a clearance fit. During operation, when the non-rotating seal carrier 105 extends with respect to the housing 106 as it slides along the bore 128, the travel or displacement of the non-rotating seal carrier 105 along the bore 128 is limited and the sliding motion arrested when the flange 508 abuts a radially extending annular face 512 that extends between the stepped portion 510 and the land 129 of the bore 128. The collar 506 and flange 508 are thus an alternative to the snap ring 212 shown in FIG. 2. Whether the collar 506 and flange 508, the snap ring 212, or any other mechanical stop is/are used to limit displacement of the non-rotating seal carrier 105 with respect to the housing 106, such displacement limitation ensures that the floating piston remains slidably supported within the piston bore as the non-rotating seal carrier reaches its maximum extension position with respect to the housing.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A rotary union, comprising:
   a housing having a bore in fluid communication with a media channel opening and a piston bore having an open end disposed at a radially offset distance with respect to the bore, the piston bore being fluidly isolated from the media channel opening, and the bore, and is fluidly connected to an actuation port;
   a non-rotating seal carrier is slidably disposed within the bore in the housing and having a media channel in fluid communication with the bore;
   an actuation arm connected to the non-rotating seal carrier and extending radially outwardly therefrom with respect to the bore, the actuation arm at least partially overlapping the open end of the piston bore;
   a piston slidably disposed within the piston bore such that a variable piston volume is defined between the piston and the piston bore, the variable piston volume being fluidly connected to the actuation port, the piston being adapted to extend out from the open end of the bore when a fluid pressure provided via the actuation port is present in the variable piston volume, the piston being configured to releasably abut the actuation arm and to urge the actuation arm, and thus the non-rotating seal carrier, to displace relative to the bore when the piston displaces relative to the piston bore;
   a seal disposed around the non-rotating seal carrier and disposed to create a sliding seal between the non-rotating seal carrier and the bore;
   wherein the non-rotating seal carrier is arranged to extend relative to the housing when the fluid under pressure is present in the piston bore;
   a second piston bore formed in the housing, the second piston bore having a corresponding open end, the second piston bore extending parallel to the piston bore;
   a second actuation arm connected to the non-rotating seal carrier and extending radially outwardly therefrom with respect to the bore, the second actuation arm at least partially overlapping the corresponding open end of the second piston bore; and
   a second piston slidably disposed within the second piston bore such that a second variable piston volume is defined between the second piston and the second piston bore, the second piston being adapted to extend out from the corresponding open end of the second piston bore at a displacement that matches a displacement of the piston when the fluid pressure is present in the second variable piston volume;

wherein the second piston is configured to releasably abut the second actuation arm and to urge the second actuation arm in concert with the piston urging the actuation arm to displace the non-rotating seal carrier relative to the bore when the piston and the second piston displace relative to the piston bore.

2. The rotary union in claim 1, wherein the actuation port is connectable with a source of pressurized fluid or vacuum, and wherein the actuation port fluidly interconnects the piston bore and the second piston bore with the source.

3. The rotary union of claim 1, wherein the actuation arm and the second actuation arm are disposed at diametrically opposite radial positions with respect to the non-rotating seal carrier and the bore.

* * * * *